United States Patent [19]

Oosaka et al.

[11] Patent Number: 4,694,362
[45] Date of Patent: Sep. 15, 1987

[54] DEVICE FOR LOADING OR UNLOADING MAGNETIC DISC PACK

[75] Inventors: Shigenori Oosaka, Kanagawa; Shinichi Matsuda, Oomiya, both of Japan

[73] Assignee: Fuji Photo Film Co., Ltd., Kanagawa, Japan

[21] Appl. No.: 648,227

[22] Filed: Sep. 7, 1984

[51] Int. Cl.$^4$ .................. G11B 5/012; G11B 23/03
[52] U.S. Cl. ........................................ 360/97; 360/133
[58] Field of Search ............... 360/86, 96.5, 96.6, 360/97, 99, 133; 369/75.2, 77.1, 77.2, 262

[56] References Cited

U.S. PATENT DOCUMENTS

| 4,139,876 | 2/1979 | Owens | 360/97 |
| 4,485,464 | 11/1984 | Shimaoka | 369/77.1 |
| 4,523,240 | 6/1985 | Dunstan et al. | 360/99 |
| 4,536,813 | 8/1985 | Saito | 360/99 X |

FOREIGN PATENT DOCUMENTS

| 3415412 | 12/1984 | Fed. Rep. of Germany | 360/97 |
| 58-143463 | 8/1983 | Japan | 360/99 |

Primary Examiner—Stuart N. Hecker
Assistant Examiner—Benjamin E. Urcia
Attorney, Agent, or Firm—Sughrue, Mion, Zinn, Macpeak, and Seas

[57] ABSTRACT

A device for loading or unloading a magnetic disc pack applicable to a magnetic recorder or reproducer in an electronic camera system wherein a subject is electronically still-photographed and recorded in a rotating magnetic disc, and the reproducing of an image is carried out by a television system or a printer.

A lid is openably supported by a main body of the magnetic recorder or reproducer. An inner bucket is pivotally supported on the main body or the lid, having a U-shaped configuration in which the magnetic disc pack incorporating a magnetic disc is received and is capable of being separated from the lid or the main body to form an opening, into which the magnetic disc pack is inserted, when the lid is opened. An engageable hole is formed in the end face of the inner bucket of the device for loading or unloading the magnetic disc pack. The engaging member is located at this engageable hole in a manner to be projectable into the engageable hole or retractable therefrom. When the lid is opened, if the magnetic disc pack is inserted into the inner bucket, then this engaging member projects into the engageable hole to retain the magnetic disc pack in the inner bucket after the inner bucket is received in the lid by the closing operation of the lid, the engaging member is retracted from the engageable hole to release the restraint of the magnetic disc pack.

2 Claims, 10 Drawing Figures

DEVICE FOR LOADING OR UNLOADING MAGNETIC DISC PACK

BACKGROUND OF THE INVENTION

1. Field of the Invention

This invention relates to a device for loading or unloading a magnetic disc pack, and particularly to a device for loading or unloading a magnetic disc pack used for a magnetic recorder or a reproducer for an electronic camera and the like and capable of magnetically recording still image information and the like.

2. Description of the Prior Art

Recently, there has been developed an electronic still camera system wherein an image pickup device such as a charge coupled device (CCD) or an image pickup tube is combined with a recording device using a magnetic disc inexpensive as a recording medium, and yet having a comparatively high memory capacity. A subject is still-photographed electronically and recorded into a rotating magnetic disc, and the reproduction of an image is carried out by a television receiver, a printer or the like, and has become the object of public attention.

The magnetic disc utilized in the above-described system is generally in the form of a magnetic disc pack. This magnetic disc pack has rotatably mounted therein a magnetic disc capable of magnetic recording therein still image information and the like, and of being installed on a magnetic recorder assembled into an electronic camera, or on a reproducer integral with the magnetic recorder or separate therefrom. In installing the magnetic disc pack to the magnetic recorder or the reproducer in the electronic camera, it is troublesome and inconvenient when installing to directly couple a center hole formed in a center core located at the central portion of the magnetic disc in the magnetic disc pack onto a rotary drive shaft of the magnetic recorder or reproducer. Also, there is the possibility that the magnetic disc pack cannot be accurately installed onto the magnetic recorder or reproducer. In order to eliminate the above-described trouble, there has been proposed, that such a device for loading or unloading a magnetic disc pack include a lid supported on a main body of the magnetic recorder or reproducer and an inner bucket or disc pack holder supported by the main body or the lid and receiving therein the magnetic disc pack. The magnetic disc pack is inserted into the inner bucket and then the lid is closed, whereby the magnetic disc is coupled onto a rotary drive shaft of the main body of the magnetic recorder or reproducer.

This inner bucket is provided therein with an ejection spring, which biases the magnetic disc pack in the inner bucket in a direction of unloading the disc, i.e. toward an inlet. In consequence, in order to insert the magnetic disc pack into the inner bucket, it is necessary to insert the magnetic disc pack against the biasing force of this spring, and after the insertion, in order for the magnetic disc pack not to be unloaded by the biasing force of the spring, it is necessary to provisionally lock the magnetic disc pack in the inner bucket in a manner so as not to be unloaded by the biasing force of the spring. On the other hand, it is necessary that the magnetic disc pack in the inner bucket may be readily taken out of the inner bucket upon completion of the recording and/or reproducing operation. In other words, if the magnetic disc pack is immovably restrained and held in the inner bucket, then the unloading by the biasing force of the spring may become impossible.

SUMMARY OF THE INVENTION

The present invention has been developed to obviate the above-described disadvantages of the prior art and has as its object the provision of a device for loading or unloading a magnetic disc pack, wherein, when a magnetic disc pack is inserted into an inner bucket or disc pack holder when a lid is opened, the magnetic disc pack is provisionally locked against the biasing force of a spring for the ejection, and when the lid is closed, the provisional lock of the magnetic disc pack is released.

To this end, the present invention contemplates that an engageable hole is formed at one end face of an inner bucket, an engaging member is located at the engageable hole in a manner so as to be projectable into the engageable hole or retractable therefrom. When the magnetic disc pack is inserted into the inner bucket the engaging member is projected into the engageable hole of the inner bucket and engages an engageable recess formed in the magnetic disc pack to restrain the magnetic disc pack in the inner bucket, and, as the lid is closed, the engaging member exits from the engageable hole to release the restraint of the magnetic disc pack.

BRIEF DESCRIPTION OF THE DRAWINGS

The exact nature of this invention, as well as other objects and advantages thereof, will be readily apparent from consideration of the following specification relating to the accompanying drawings, in which like reference characters designate the same or similar parts throughout the figures thereof and therein.

DETAILED DESCRIPTION OF THE INVENTION

A detailed description will hereunder be given of the preferred embodiment of a device for loading or unloading a magnetic disc pack according to the present invention with reference to the accompanying drawings.

Figure 1:
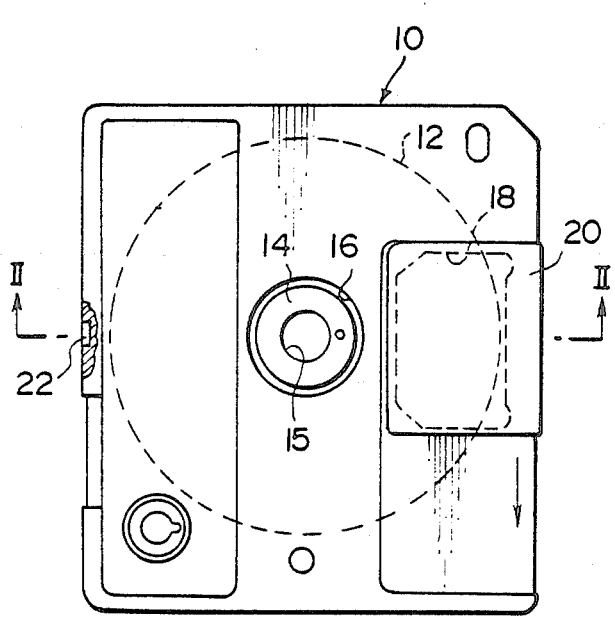
FIG. 1 is a plan view showing the magnetic disc pack.
Figure 2:
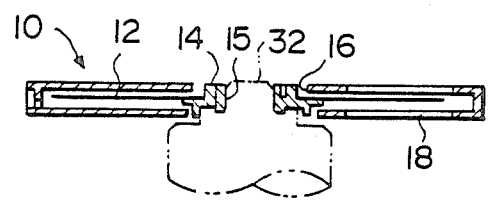
FIG. 2 is a sectional view showing the magnetic disc pack, taken along the line II—II in FIG. 1.

FIG. 1 is a plan view showing a magnetic disc pack used in a magnetic recorder or a reproducer in an electronic camera or the like, and FIG. 2 is a sectional view taken along the line II—II in FIG. 1. As shown in FIG. 1, the magnetic disc pack 10 is of generally square plan shape and has rotatably mounted therein a magnetic disc 12 capable of recording thereon, still image information and the like. The magnetic disc 12 is provided in the central portion thereof with a center core 14 being a reinforcing member, which is exposed to outside through a circular opening 16 of the magnetic disc pack 10. The magnetic disc pack 10 is formed with a window 18, at which is located a magnetic head to be described here and after, and this window 18 for the magnetic head is opened or closed by a slidable shutter 20. More specifically, before the magnetic disc pack 10 is inserted into an inner bucket to be described hereinunder, the shutter 20 closes the window 18 to prevent dust from attaching to the magnetic disc 12, and, when the magnetic disc pack 10 is inserted into the inner bucket, the shutter 20 moves in the direction of the arrow within pack 10 in FIG. 1 to open the window 18 for the magnetic head, whereby the recording in the magnetic disc 12 and the reproduction therefrom can be performed. An engageable recess 22 is formed at an end face opposite to the shutter 20 of the magnetic disc pack 10. This recess 22 is used as a provisional lock for the magnetic disc pack 10 when the magnetic disc 12 is inserted into the inner bucket as will be described hereunder.

Figure 3:
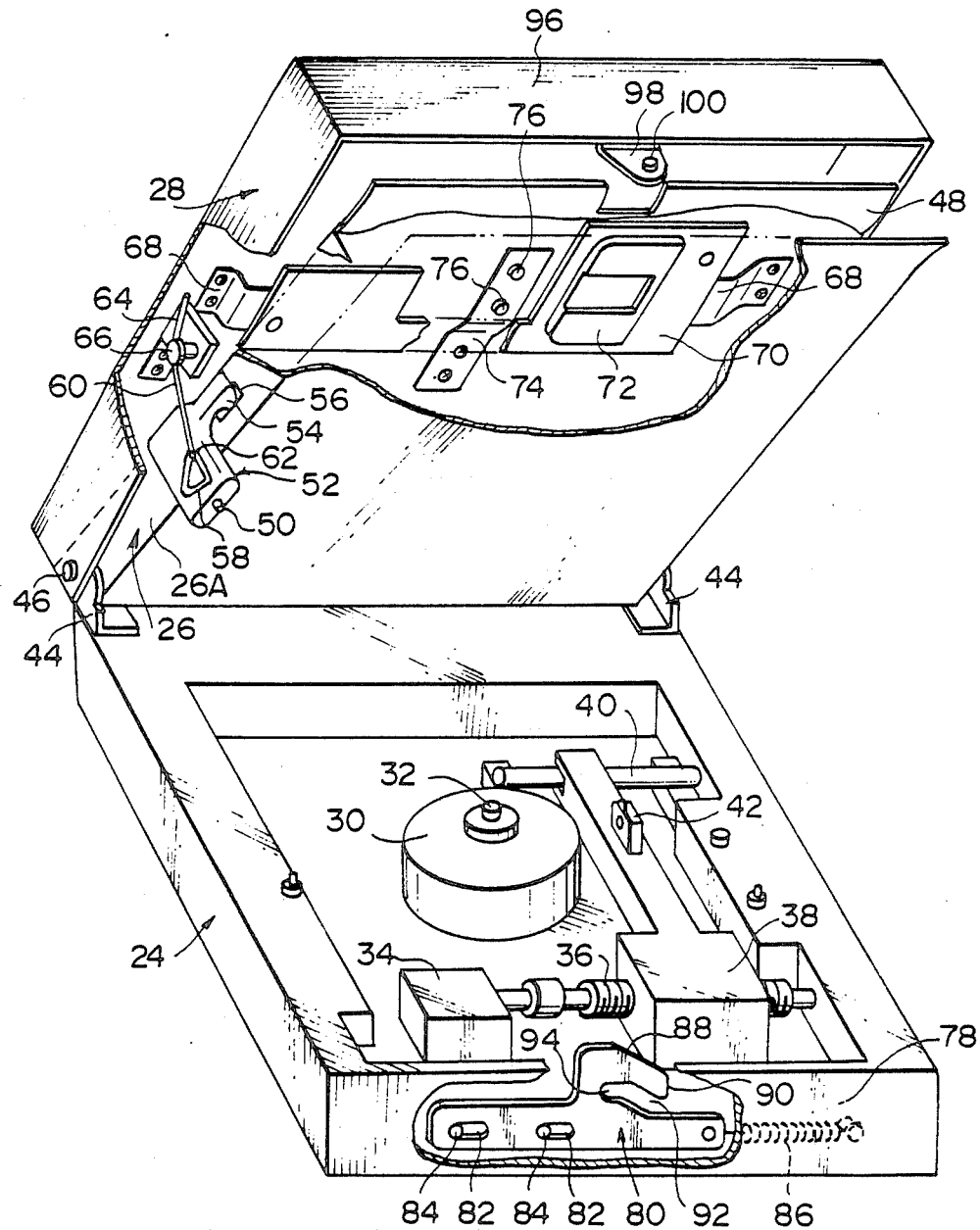
FIG. 3 is a perspective view showing the magnetic recorder or reproducer of an electronic camera, to which the device for loading or unloading the magnetic disc pack according to the present invention is applied.

FIG. 3 shows the magnetic recorder or reproducer of an electronic camera or the like, incorporating the device for loading or unloading the magnetic disc pack according to the present invention. The magnetic recorder or reproducer includes a main body 24, a U-shaped inner bucket or disc pack holder 26 and a lid 28. Firstly, description will be given to the inner construction of the main body 24 of the magnetic recorder or reproducer. The main body 24 is provided therein with a motor 30 for driving a magnetic disc 12. A drive shaft 32 of this motor 30 is coupled into a center hole 15 of a center core 14 of the magnetic disc pack 10 as shown in FIG. 1 and rotates the magnetic disc 12 at a predetermined rotation number in the magnetic disc pack 10. In FIG. 3, designated at 34 is a motor for driving the magnetic head, 36 a lead screw connected to an output shaft of this motor 34, 38 a head carriage threadably coupled to this lead screw 36 and guided by a guide shaft 40 to move, and 42 a magnetic head provided on the head carriage 38. In consequence, when the motor 34 is rotated at a predetermined rpm, the head carriage 38 is moved by a predetermined pitch in the axial direction of the guide shaft 40 by the rotation of the lead screw 36, whereby the magnetic head 42 moves in the radial direction of the magnetic disc 12, so that the still image information can be recorded or reproduced per track on the magnetic disc 12.

The main body 24 of the magnetic recorder or reproducer is provided at an end portion thereof with brackets 44 and 44, on which the inner bucket 26 and the lid 28 are pivotally supported through a pin 46. As shown in the drawing, the lid 28 is of a shape capable of housing the inner bucket 26. The lid 28 is biased by a torsional spring 29 shown in FIG. 4 in the open position on the main body 24 of the magnetic recorder or reproducer. Further, provided between the lid 28 and the inner bucket 26, is another leaf spring 27, which biases the inner bucket 26 in a direction of being separated from the lid 28. In consequence, in the state where the lid 28 is opened as shown in FIG. 3, the inner bucket 26 is separated from the main body 24 and the lid 28, defining an opening 48 for receiving the magnetic disc pack 10 of the inner bucket 26.

The surface, opposed to the main body 24, of the inner bucket 26 is formed with a plurality of openings for respectively receiving a rotary shaft 32 provided on the main body 24, and a magnetic head 42 and a positioning pin provided on the main body 24 for positioning the main body 24 and the magnetic disc pack 10.

An engaging member 52 is rockably supported through a shaft 50 on the left side face 26A of the inner bucket 26 in FIG. 3. More specifically the inner bucket 26 is provided with a bracket (not shown) and the engaging member 52 is rockably supported through a shaft 50 provided on this bracket. This engaging member 52 is projectingly provided with an engaging pawl 54, which opposes an engageable hole 56 formed on an end face 26A of the inner bucket 26. The engageable hole 56 is formed at a position opposed to the engageable recess 22 of the magnetic disc pack 10 when the magnetic disc pack 10 is completely inserted into the inner bucket 26. Further, a groove 58 of a generally triangular shape is formed on the outer surface of this engaging member 52. As shown in FIG. 3, the triangular groove 58 is formed to stride the shaft 50. A pin 62 formed by bending the forward end of a spring 60 into an L-shape is slidably and loosely coupled into this groove 58. The spring 60 is mounted on the rear surface of the lid 28 through a bracket 64 and a pin 66 and biases the engaging member 52 toward the side face 26A of the inner bucket 26 and has a biasing force due to its bending itself about the pin 66 in the clockwise direction in FIG. 3.

Further, leaf springs 68, each are bent into a crank shape are provided on the rear surface of the lid 28 at predetermined spaced positions. A regulating plate holder 70 is mounted to the leaf springs 68 and 68. The regulating plate holder 70 is provided thereon with a regulating plate 72 for bringing the magnetic disc 12 into stable contact with the magnetic head 42. The regulating plate 72 is formed at a position opposed to the magnetic head 42, when the lid 28 is closed.

Further, a pair of push pins 76, are provided on the rear surface of the lid 28 at a predetermined spacing, on a leaf spring 74. During the operation of closing the lid 28, the push pins 76 and 76 push the center core 14 of the magnetic disc 12 toward the drive shaft 32 to cause reliably insertion of the drive shaft 32 into the center hole 15 of the center core 14.

A slide key 80 is mounted to a front edge 78 of the main body 24 of the magnetic recorder or reproducer in a manner to be slidable in the lateral direction of edge 78 in FIG. 3. This slide key 80 is formed with slots 82 and 82, into which pins 84 and 84 project from the front edge 78 to couple the key 80 to body 24, whereby the slide key 80 movement is regulated. A spring 86 engages the right end of the slide key 80, whereby the slide key 80 is biased to the right. The slide key 80 is formed at the top end portion thereof with a hook having a tapered edge portion 88, a side edge 90 downwardly from the terminating end portion of tapered portion 88, and a groove 92 inclines upwardly to the left from the bottom end portion of the side edge 90. Further, the left end portion of this inclined groove 92 communicates with a lateral groove 94. On the other hand, a tongue 98 is mounted to one face at a front edge of the lid 28, and a lock pin 100 projects from the end of tongue 98. In consequence, when the lid 28 is closed toward the main body 24, the lock pin 100 firstly comes into contact with the tapered edge portion 88 of the hook, and further, when the lid 28 is pushed down, the slide key 80 moves to the left against the biasing force of the spring 86, the lock pin 100 slides down along the tapered portion, thereafter, passes through the side edge 90 while being in contact with the side edge 90, and then, enters the inclined groove 92 from the side edge 90 whereby the hook captures the lock pin 100. When the force applied to the lid 28 is removed in the state where the lock pin 100 is in the inclined groove 92, the slide key 80 is pulled by the spring 86, the lock pin 100 goes up in the inclined groove 92 and is positioned in the lateral groove 94. When the lock pin 100 is positioned in the lateral groove 94, this position is the normally closed position of the lid 28. In consequence, when the lock pin 100 is positioned in the inclined groove 92, the lid 28 is in the state where the lid 28 is biased into overclosed position in the closing direction from the normally closed position.

Figure 4:
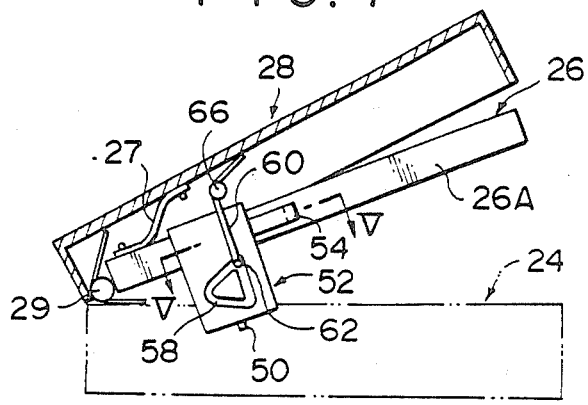
FIGS. 4 to 8 are views illustrating the embodiment of the device for loading or unloading the magnetic disc pack according to the present invention is actuated positions, FIG. 4 being a sectional view showing the positional relationship between the lid and the inner bucket, FIG. 5 being a sectional view taken along the line V—V in FIG. 4, FIG. 6 being sectional view showing the positional relationship between the inner bucket and the lid, FIG. 7 being a sectional view of the relationship between the lid and the inner bucket, showing the conditions where the lid is pushed in somewhat overstroke manner, and FIG. 8 being a sectional view taken along the line VIII—VIII in FIG. 7.
Figure 5:
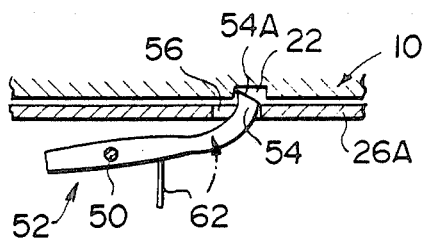

The following is the action of the embodiment with the above-described arrangement according to the present invention. FIG. 4 shows the positional relationship between the inner bucket 26 and the lid 28 as shown in FIG. 3, in which the pin 62 is positioned rightwardly of the shaft 50 in FIG. 4. In consequence, a rotary biasing force centered about the shaft 50 in the counterclockwise direction in FIG. 5 is given to the engaging pawl 54, and the engaging pawl 54 projects into the engageable hole 56 formed in the side face 26A of the O-U-shaped inner bucket 26. When the magnetic disc pack 10 is inserted in this state, the front edge of the magnetic disc pack 10 abuts against the tapered portion 54A on the forward end of the engaging pawl 54. When the magnetic disc pack 10 is further inserted, the engaging pawl 54 is slightly rotated in the clockwise direction against the biasing force of the spring 60 by the magnetic disc pack 10, however, pawl 54 remains projecting within the engageable hole 56. Meanwhile, when the engageable recess 22 formed in the side surface of the magnetic disc pack 10 comes into the position proximate to the engageable hole 56, the engaging pawl 54 moves into the engageable recess 22, so that the magnetic disc pack 10 is restrained in the inner bucket 26.

Figure 6:
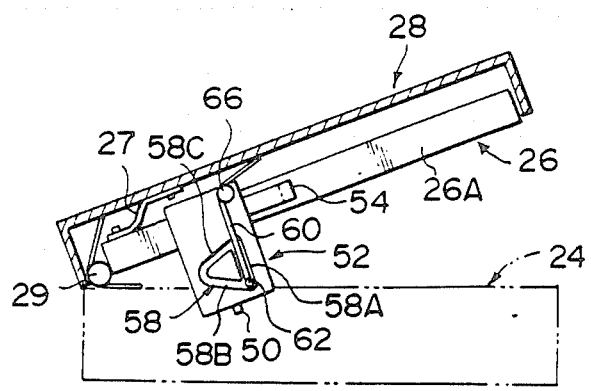
Figure 7:
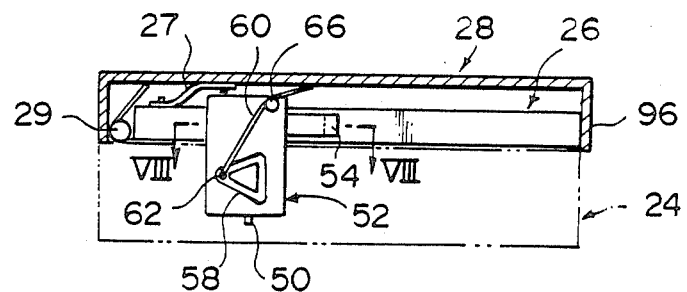
Figure 8:
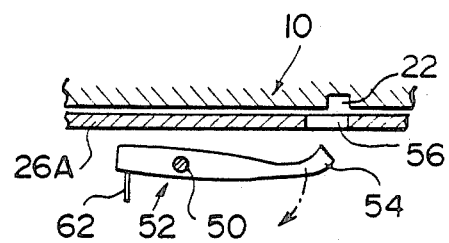

Subsequently, when the lid 28 is closed, the inner bucket 26 is received by the lid 28, against the biasing force of the spring 27, as shown in FIG. 6. Under this condition, the pin 62 moves downward in the portion 58A of the groove 58, however, it is still positioned rightwardly of the shaft 50, whereby the engaging pawl 54 is in the position shown in FIG. 5. Subsequently, when the lid 28 is closed to insert the pin 100 into the inclined groove 92, partially defining the hook, the lid 28 is driven into an overstroke position by spring 86, the pin 100 goes up in the inclined groove 92, and meanwhile, reaches the lateral groove 94. On the other hand, in association therewith, the pin 62 moves in the portion 58B of the groove 58 and comes to a position in FIG. 7 from the position in FIG. 6. Since the pin 62 is positioned overcenter, leftwardly of the shaft 50 in the position thereof in FIG. 7, the engaging member 52 is automatically rotated in the clockwise direction in FIG. 8, whereby the engaging pawl 54 is released from the engaging hole 56. In consequence, the magnetic disc pack 10 in the inner bucket 26 is released from the restraint thereof. In this state, the magnetic disc pack 10 is biased in the unloading direction by the spring for the ejection, however, restricted in movement by the front edge 96 of the lid 28 and still remains in the inner bucket 26. In this state, recording or reproducing can be effected on the magnetic disc 12 by the magnetic head 42. When the lid 28 is opened upon completion of the recording or reproducing, the inner bucket 26 is separated from the lid 28 through the agency of the spring 27, and the magnetic disc pack 10 in the inner bucket 26 is unloaded through the agency of the ejection spring.

Figure 9:
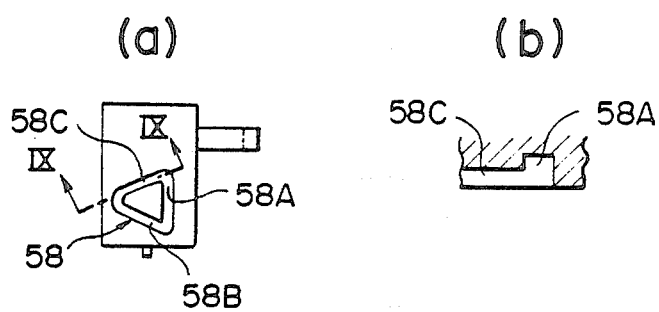
FIGS. 9(a) and 9(b) show the shapes of cross sections of the groove 58 of the engaging member 52, FIG. 9(a) being a sectional view thereof and FIG. 9(b) being a sectional view taken along the line IX—IX in FIG. 9(a).

FIG. 9 shows the section of the groove 58 of the engaging member 52. The shape of the section taken along the line IX—IX of the groove 58 in FIG. 9(a) is determined, as shown in FIG. 9(b), such that the portion 58A is larger in depth than the portion 58C to form a stepped portion therebetween, so that, in the process from the state in FIG. 4 to the state in FIG. 6, the possibility of occurrence of a mistaken operation such that the pin 62 of the spring 60 moves into the groove 58C, can be eliminated.

As has been described hereinabove, in the device for loading or unloading the magnetic disc pack according to the present invention, the engageable hole is formed in the end face of the inner bucket, the engaging pawl of the engaging member is located at this engageable hole in a manner so as to be projectable into the engageable hole or retractable therefrom, the engaging pawl is coupled into the engageable hole of the inner bucket to restrain the magnetic disc pack in the inner bucket when the magnetic disc pack is inserted into the inner bucket, and the engaging pawl is disengaged to release the magnetic disc pack when the lid is closed, so that the loading and unloading of the magnetic disc pack can be readily and reliably effected.

What is claimed is:

1. A device for loading or unloading a magnetic disc pack, said device comprising a lid, means for pivotally mounting said lid on one end of a main body of a magnetic recorder and/or a reproducer, and a disc pack holder, pivotally supported on said lid for opening away from said lid and being of U shape in cross section along a line parallel to the direction of cartridge insertion, said disc pack holder being capable of receiving therein said magnetic disc pack, said magnetic disc pack incorporating a magnetic disc therein, and wherein said device further comprises:

an opening formed at one side face of said U shaped disc pack holder; and an engaging member, means for mounting said engaging member on said disc pack holder side face in juxtaposition to said opening formed in said one side face, said engaging member having a portion projectable into said opening or retractable therefrom and engageable with said disc pack, and means operatively engaging both said lid and said engaging member and responsive to lid opening for causing said engaging member portion to project into said opening to engage said disc pack to restrain said magnetic disc pack in said disc pack holder when said lid is opened, and responsive to lid closing to retract said engaging member portion from said opening in said one side face of said U shaped disc pack holder to release the restraint of said magnetic disc pack when the lid is closed and wherein said engaging member is rockably supported on said one side face of said U shaped disc pack holder; and a push member is mounted to said lid and has an end remote from said lid including means in contact with said engaging member for pushing one side of said engaging member to rock said engaging member in a first direction to cause said engaging member portion to be inserted into said opening of the disc pack holder when said lid is opened, and for pushing the other side of said engaging member to rock said engaging member in a second direction upon closing of said lid, so that said engaging member portion is retracted from said opening within the one side face of said U shaped disc pack holder to release the restraint of said magnetic disc pack.

2. A device for loading or unloading a magnetic disc pack as set forth in claim 1, wherein said means for mounting said engaging member on said disc pack holder one side face comprises means for pivotably mounting said engaging member for pivoting about an axis parallel to the one side face of said U shape disc pack holder, wherein said engaging member includes a side face parallel to said one side face of said U shaped disc pack holder which includes a triangular guide groove having portions extending to opposite sides of the pivot axis of the pivotably mounted engaging member, and wherein the end of said push member remote from said lid engages said groove such that during closure of said lid, said end of said push member moves in said groove and crosses the engaging member pivot axis; to pivot said engaging member in different directions to respective sides of the pivot axis, such that during lid opening, said engaging member is pivoted in a direction causing said engaging member portion to project into said opening to restrain said magnetic disc pack, while during lid closure, the end of said push member moves within said triangular guide groove to a position pivoting said engaging member in the opposite direction, thereby retracting said engaging member portion from said opening to release the restraint of said magnetic disc pack.

* * * * *

UNITED STATES PATENT AND TRADEMARK OFFICE
CERTIFICATE OF CORRECTION

PATENT NO. : 4,694,362

DATED : September 15, 1987

INVENTOR(S) : Shigenori Oosaka et al.

It is certified that error appears in the above-identified patent and that said Letters Patent is hereby corrected as shown below:

On the Title Page add:

-- Item [30]  Foreign Application Priority Data.  Japan Patent Application No. 58-165469, Filed September 8, 1983.--

Signed and Sealed this

Seventeenth Day of May, 1988

Attest:

DONALD J. QUIGG

Attesting Officer

Commissioner of Patents and Trademarks